United States Patent [19]

Adair

[11] 3,895,628

[45] July 22, 1975

[54] BODY ENCOMPASSING BANDAGE PROTECTOR FOR DOGS AND OTHER SUCH ANIMALS

[76] Inventor: Georga Ann Adair, 322 Milburn Dr., Fayetteville, N.C. 28304

[22] Filed: Mar. 25, 1974

[21] Appl. No.: 454,072

[52] U.S. Cl. .................... 128/171; 119/143; 54/79
[51] Int. Cl. ..................... A61f 13/00; A01k 21/00
[58] Field of Search ........ 128/171, 132 D, 133–134, 128/156–157, 155; 119/102, 143, 146, 96, 1, 95; 54/23–24, 71, 79

[56] References Cited
UNITED STATES PATENTS

| | | | |
|---|---|---|---|
| 1,538,596 | 5/1925 | Schroedter | 54/79 |
| 1,549,598 | 8/1925 | Millsap | 119/146 |
| 2,131,495 | 9/1938 | Allen | 54/79 |
| 3,141,443 | 7/1964 | Huey | 119/143 |
| 3,792,687 | 2/1974 | Ehrman | 119/95 |

FOREIGN PATENTS OR APPLICATIONS

| | | | |
|---|---|---|---|
| 1,145,491 | 1969 | United Kingdom | 128/171 |

Primary Examiner—Richard A. Gaudet
Assistant Examiner—Rick Opitz
Attorney, Agent, or Firm—Mills and Coats

[57] ABSTRACT

A body encompassing bandage protector adapted to be fitted on a dog or other type of four-legged animal for encompassing and covering a substantial area of the animal's body, and particularly for covering and protecting a bandage that may be applied to the animal's body. The body fitting bandage protector basically comprises a main body covering material that when placed on the dog or animal covers the animal's stomach, abdomen, and chest areas, and extends upwardly around the rib cage of the animal where two terminal side edges of the main body covering material are secured together across the back of the animal to securely hold the bandage protector around the animal's body. Extending from the front portion of the main body covering material is a series of loops which are adapted to receive and connect to a collar worn by the animal. Formed about the rear portion of the main body covering material is a pair of cross straps that extend from the outer top corners of the main body covering material and cross about the rump of the dog from which the straps continue downwardly between the rear legs of the dog where they join an intermediate portion of the main body covering material.

11 Claims, 7 Drawing Figures

BODY ENCOMPASSING BANDAGE PROTECTOR FOR DOGS AND OTHER SUCH ANIMALS

The present invention relates to protecting coverings for animals, and more particularly to a protective bandage covering of the type adapted to encompass a substantial area of an animal's body and to cover a bandaged wound formed in a portion of the body to prevent the animal from pulling or tearing the bandage away from the particular wound.

BACKGROUND OF THE INVENTION

Dogs and other animals have a tendency to bite and pull bandage coverings from body wounds. When the wound, whether it be a result of surgery or an accident, is unprotected by a bandage covering the healing process is likely to be slowed and the open wound is susceptible to infection. If the wound is infected the life of the animal is often placed in jeopardy and the recovery period is prolonged.

In the past, to prevent the dog or animal from biting and pulling the bandage from the wound, it has been common practice, especially among veterinarians, to place an open bottom bucket type structure around the dog's neck and head. While this is a cumbersome and awkward approach, it nevertheless has been used and because of the seriousness of the problem has been to a limited extent successful. But besides being awkward and cumbersome, the open bottom bucket often restricts the mobility of the animal and seriously hampers the animal's ability to become comfortable. This is especially true when the animal attempts to rest or sleep by laying on his stomach or side.

Even with the open bottom bucket technique discussed above, the bandage covering is still exposed and it is possible for the dog to rub the bandage against a stationary object or structure and cause the bandage to be disattached from the wound, or to even scratch the bandage from the wound by the use of one or more of the animal's paws. Consequently, it is seen that the open bottom bucket technique only protects the bandage from the animal's mouth and does not give protection against other ways in which the animal is prone to aggravate the bandage covering.

SUMMARY OF THE INVENTION

The body encompassing bandage protector of the present invention has been devised to provide a simple, workable, body fitting means for protecting a bandage covering secured about a wound in the animal's body. In particular, the body encompassing bandage protector covers the stomach, abdomen, and chest areas generally between the front and rear legs of the animal's body and wraps upwardly about the rib cage and side of the animal's body on both sides. Thus, a substantial area of the animal's body extending between the front and rear legs is covered and protected.

To secure the body encompassing bandage protector about the main body of the animal, means are provided about the front of the bandage protector to attach directly to a collar worn about the animal's neck. Cross straps are provided about the rear of the bandage protector which when fitted on the dog or animal crosses about the rump portion of the body and extends generally downwardly therefrom behind and through the rear legs of the animal where the straps join the main body of the bandage protector. Therefore, it is seen that the bandage protector of the present invention is securely held between the animal's neck and the rump and tail portion of the animal's body. This, of course, keeps the bandage protector from being pulled or moved axially along the main generally cylindrical body portion extending between the front and rear legs of the animal.

It is, therefore, an object of the present invention to provide a body fitting bandage protector for animals that is simple, workable and comfortable, and which does not limit the animal's mobility and ability to position himself for comfortable rest or sleep.

A further object of the present invention is to provide a body fitting bandage protector for an animal that can easily and conveniently be placed about the animal's body without requiring a great deal of time and effort.

Another object of the present invention is to provide a body fitting bandage protector that fits snugly, but comfortably, about the animal's body such that it will remain properly intact under normal wearing conditions and which will resist being pulled off by the animal rubbing against stationary structures and objects or the animal clawing at the bandage protector.

A further object of the present invention is to provide a body encompassing material that may also be employed to: (1) prevent access to a female animal's reproductive organs during a fertile period, or (2) to wean young animals from their Mother by preventing access to the Mother's breast.

Still a further object of the present invention is to provide a relatively inexpensive surgical bandage protector for animals that could be constructed of a disposable material as well as a permanent or semipermanent material that could be washed, sterlized and reused.

A further object of the present invention is to provide a body encompassing material with front and rear attaching means that utilize the natural shape and parts of the animal's body to secure the body encompassing material about the animal's body and prevent the same from moving lengthwise relative thereto.

Other objects and advantages of the present invention will become apparent from a study of the following description and the accompanying drawings which are merely illustrative of the present invention.

Figure 1:
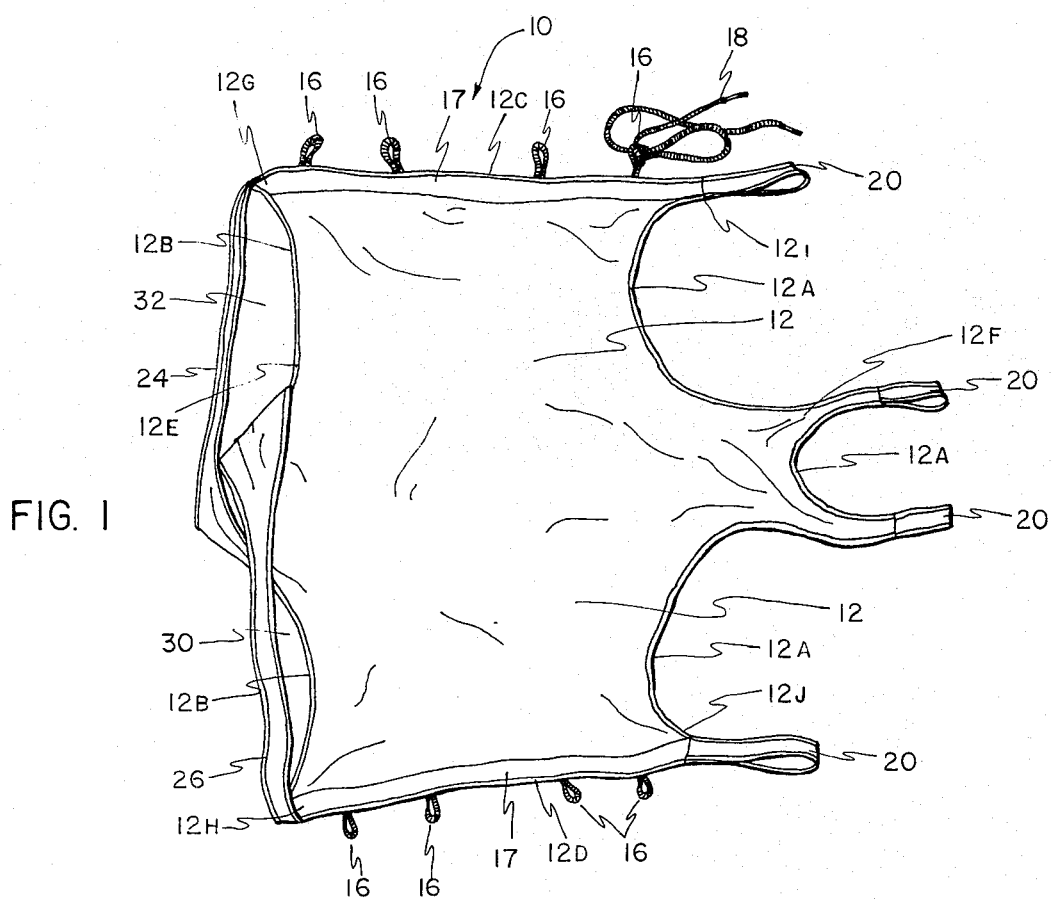
FIG. 1 is an inside spread open plan view of the animal bandage protector of the present invention.
Figure 2:
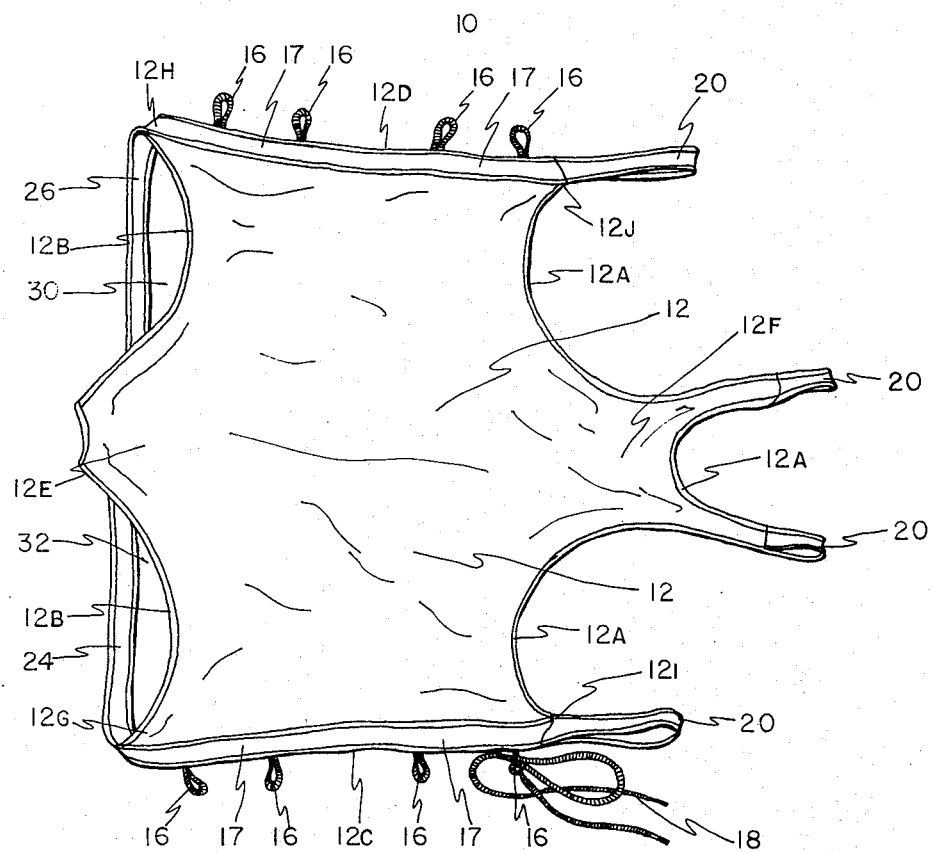
FIG. 2 is an outside spread open plan view of the animal bandage protector shown in FIG. 1.
Figure 6:
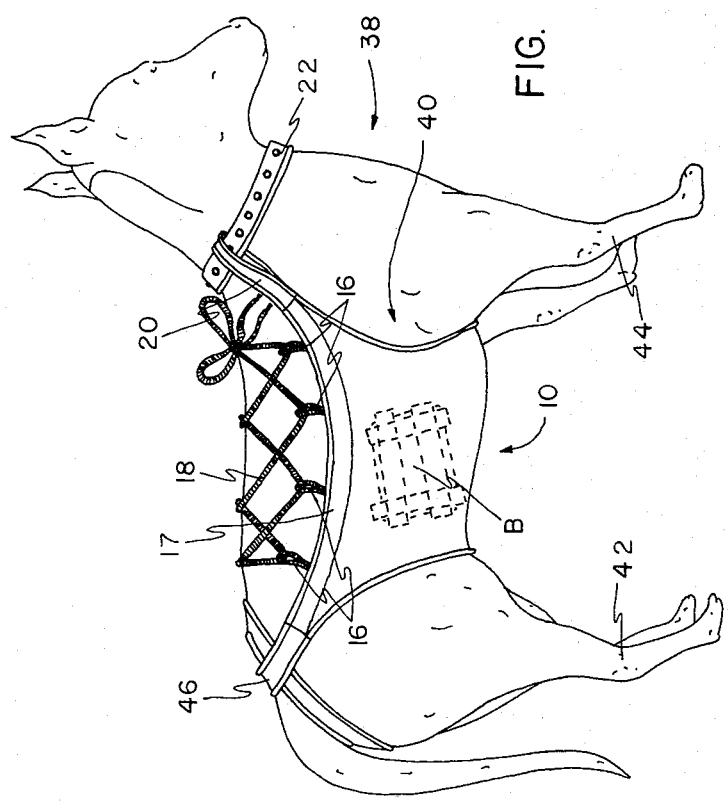
FIG. 6 is a side elevational view of the animal bandage protector shown in FIGS. 1 and 2 with the bandage protector being disposed about the main body of a dog.

With further reference to the drawings, particularly FIGS. 1, 2 and 6, the body encompassing bandage protector of the present invention is shown therein and indicated generally by the numeral 10. Viewing the body encompassing bandage protector 10 in greater detail, it is seen that the same comprises a main body covering means 12 (hereinafter referred to as a main body) adapted to fit around the body of an animal such as the dog shown in FIG. 6.

With reference to the main body 12, it is seen that the same includes a front boundary 12a and a rear boundary 12b. Each of the referred to boundaries extend across the front and rear ends of the main body 12 between two separable terminal side edges 12c and 12d. As will be discussed in greater detail subsequently herein, the two separable terminal side edges 12c and 12d extend generally parallel with the backbone of the animal when the body encompassing bandage protector 10 is properly fitted on the animal.

Continuing to refer to the main body 12 of the body encompassing bandage protector 10, it is seen that the same includes a front chest extension portion 12f that lies intermediately between front outer corners 12i and 12j when the bandage protector is spread open as in FIG. 1. Also, the main body 12 includes a rear intermediate extension portion 12e that is generally aligned with the front chest extension portion 12f and lies generally between rear outer corners 12g and 12h.

Figure 5:
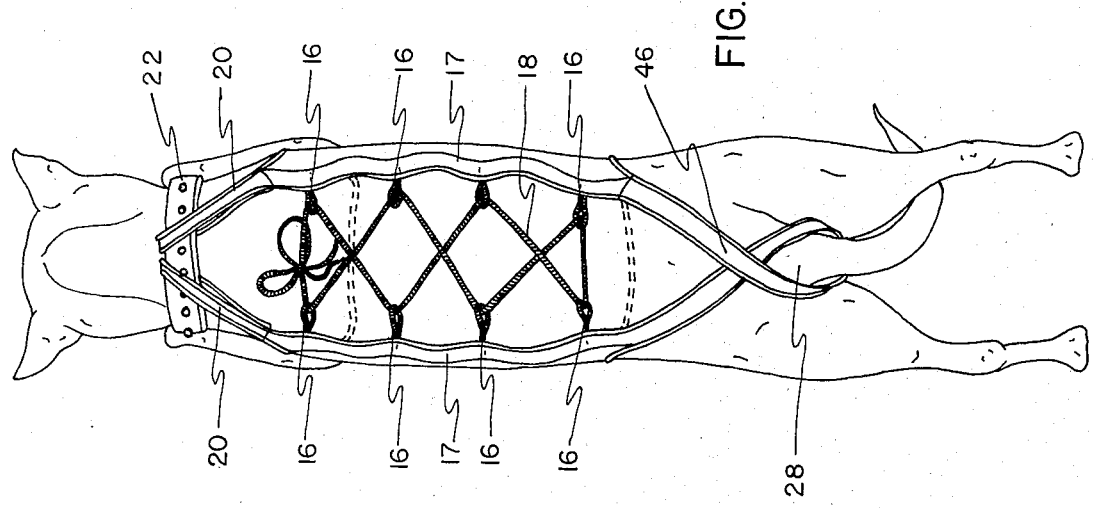
FIG. 5 is a top plan view of the animal bandage protector shown in FIGS. 1 and 2 fitted on a dog.

In the species shown in FIGS. 1 and 2, the main body 12 is provided with a reinforcing strap 17 along each terminal side edge 12c and 12d. Secured to the reinforcing strips 17 are a series of spaced apart lace loops 16 which are adapted to receive a lace string 18 which as illustrated in FIGS. 5 and 6 is laced in zig-zag fashion across the back of the animal having the bandage protector 10 fitted thereon. Thus, it is seen that the lace string 18 acts to hold the main body 12 of the body encompassing bandage protector 10 snugly against the body of the animal wearing the same.

Extending from the front portion of the main body 12 are a series of front connecting means in the form of collar receiving loops 20, the loops being spaced apart and adapted to encircle and attach around a collar 22 connected around the animal's neck. With respect to the preferred embodiments of FIGS. 1 through 4, the main body 12 includes a collar loop 20 extending from a point generally adjacent the outer front corners 12i and 12j of the main body 12. Also, collar loops 20 are particularly provided about the front corners of the front chest extension 12f. So consequently when the body encompassing bandage protector 10 is positioned in an encircling fashion around the main body of the animal, the collar loops 20 become generally circumferentially spaced in attached relationship to the animal's collar 22.

Joined to the rear portion of the main body 12 is a pair of cross straps 24 and 26. As particularly illustrated in the drawings, each cross strap extends from a rear corner of the rear extension portion 12e across the other strap and on over to the opposite rear corner of the main body 12. To more clearly illustrate the relationship between the cross straps and the main body 12, it is seen in FIG. 1 that cross strap 24 extends from the rear corner of the rear extension portion 12e, across the other strap 26, and over to join the main body 12 at rear corner 12g. Likewise, strap 26 extends from main body 12, across the other strap 24, and to the opposite corner 12h of the main body 12 where the strap joins the main body. This cross relationship of the straps 24 and 26 define a tail hole opening 28 for receiving the animal's tail, and a pair of leg openings 30 and 32 spaced on each side of the tail hole opening 28 and adapted to receive a respective rear leg of the animal which is to be fitted with the body encompassing bandage protector 10 of the present invention.

Figure 3:
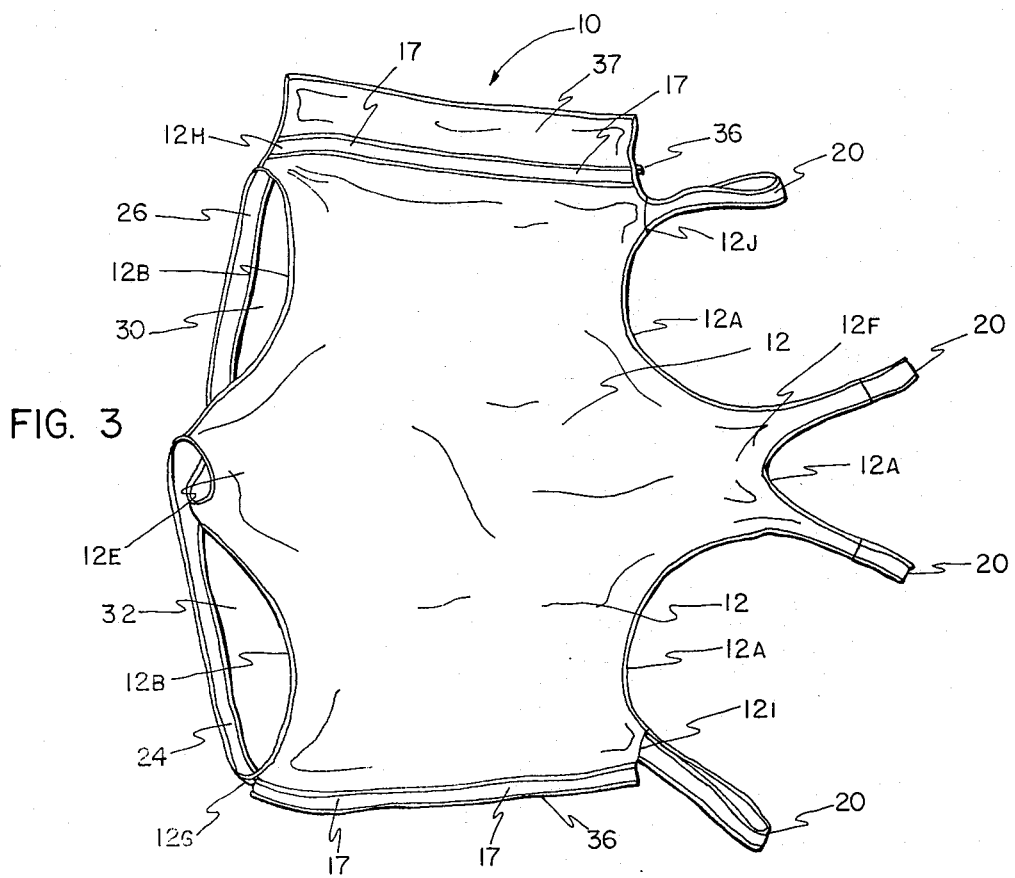
FIG. 3 is an outside spread open plan view of a second species of the animal bandage protector of the present invention.
Figure 4:
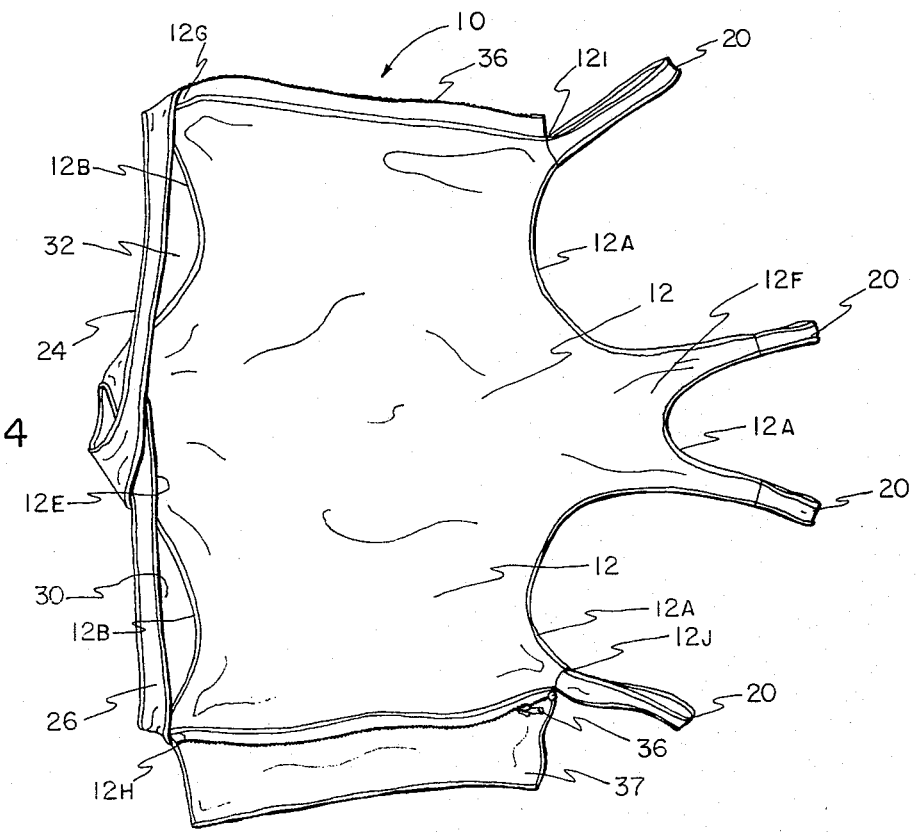
FIG. 4 is an inside spread open plan view of the second species of the animal bandage protector shown in FIG. 3.

Turning to FIGS. 3 and 4, a second species of the body encompassing bandage protector 10 is shown therein. The structure and construction of the second species is preferably the same as that of the first species shown in FIGS. 1 and 2 except that the second species includes a zipper assembly 36 operatively associated with the two terminal side edges 12c and 12d for joining these two terminal edges and securedly holding the bandage protector 10 about the body of the particular animal being suited. It is seen in FIGS. 3 and 4 that the second species also includes a side edge flap 37 secured about one of the two terminal side edges 12c and 12d to complement the zipper assembly 36.

with reference to FIGS. 5 and 6, the body encompassing bandage protector 10 of the first species is shown therein properly fitted on a dog indicated generally by the numeral 38. As illustrated in FIG. 6, the dog has a bandage B shown in dotted lines which is covered and protected by the body encompassing bandage protector 10.

It is seen when properly fitted on the dog 38 a substantial area of the main body 40 of the dog is covered and protected by the bandage protector 10. For purposes of discussion, the main body portion of the dog is understood to be that generally cylindrical shaped body portion that extends between the thighs of the front and rear legs and includes among other parts of the dog's body, the abdomen, stomach, rib cages on both sides, chest and back.

To suit the bandage protector 10 on the dog 38 or other four-legged animal, the dog's rear feet are placed through the leg openings 30 and 32. The rear portion of the bandage protector 10 is then pulled up adjacent the lower portion of the dog's body and the dog's tail is properly pulled through the tail opening 28. Cross straps 24 and 26 are particularly manipulated so that they cross about the rump 46 of the dog, as illustrated in FIGS. 5 and 6.

Next the dog's collar 22 is threaded through the collar loops 20 spaced about the front portion of the main body 12 of the bandage protector 10. The collar 22 is then fastened about the dog's neck and, therefore, it is seen that the main body 12 of the bandage protector 10 is firmly held against longitudinal movement along the main body 40 of the dog 38 by the cross straps 24 and 26 and the front connecting collar loops 20 which are connected to the collar 22. To vertically support the main body 12 of the bandage protector 10, the lace string 18 is threaded through the lace loops 16 in a zig-zag fashion and properly tied closely behind the dog's neck. If the second species (FIGS. 3 and 4) is used, the zipper assembly 36 is zipped closed, thereby completely encompassing the main body area of the dog.

Figure 7:
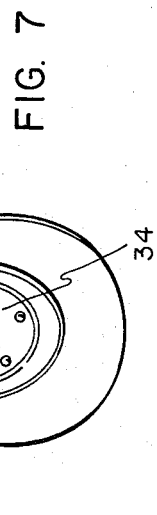
FIG. 7 is a rear view of the animal bandage protector particularly illustrating the insert flap that is detachably connected within a tail hole opening formed about the rear of the bandage protector when such is properly fitted on an animal.

Now referring to FIG. 7, it is seen that an insert flap 34 is detachably secured (by snaps, buttons, or other suitable means) in the tail hole opening 28 of the bandage protector 10. Insert 34 may be used in conjunction with the bandage protector 10 when the female dog or animal is in heat. By placing the insert flap 34 in the tail hole opening 28, it is appreciated that access to female's reproductive organs cannot be gained and the female animal may not be impregnated. It also should be pointed out at this time that the bandage protector 10 of the present invention may also be used to wean the young from their Mother by preventing access to the Mother's breast.

As far as the material used to construct the bandage protector 10 is concerned, it is contemplated that either a disposable type of material, or a permanent or semipermanent fabric type of material may be utilized. In the case of a fabric type material, it has been found that a stretchable polyester is suitable for use and is especially comfortable for the dog or animal. Where the bandage protector is constructed of a fabric, it follows that the same can be washed, sterilized and reused after a period of use.

From the foregoing specification, it is apparent that the bandage protector 10 of the present invention serves many useful purposes and is especially beneficial to protect and cover a bandage that is used to cover a wound in the animal's body. In this regard, the bandage protector 10 is very much suited for use by veterinarians after surgery, especially major surgery to the main body of the animal. In addition, the same protective covering can be used to prevent pregnancy in female animals as well as to wean the young from their Mother. All of these useful purposes are accomplished with a body encompassing protective covering that is simple and relatively inexpensive and is particularly comfortable for the animal to wear and does not limit or restrict his mobility.

The terms "upper," "lower," "forward," "rearward," etc., have been used herein merely for the convenience of the foregoing specification and in the appended Claims to describe the body encompassing bandage protector for dogs and other such animals and its parts as oriented in the drawings. It is to be understood, however, that these terms are in no way limiting to the invention since the body encompassing bandage protector for dogs and other such animals may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A body encompassing bandage protector for animals comprising:
    a. a main body encompassing covering means for encompassing a substantial area of an animal's body and for protecting a bandage thereunder;
    b. said main body encompassing covering means having two separable terminal side edges that allow said main body encompassing covering means to be directly placed about the body of said animal;
    c. said main body encompassing means further including front and rear boundaries that extend between said separable terminal side edges and across respective front and rear end portions of said main body encompassing covering means;
    d. means for interconnecting said two separable terminal side edges such that said main body encompassing covering means is securedly held about the animal's body;
    e. front loop connecting means integrally connected to the front portions of said main body encompassing covering means for attaching to a collar like member normally secured around the animal's neck; and
    f. a pair of cross straps integrally connected to the rear portion of said main body encompassing covering means, each cross strap extending from an intermediate rear area of said body covering means across the other cross strap and integrally connected to an outer portion of said main covering means such that the crossing straps define a central tail opening and a leg opening on each side thereof.

2. The body encompassing bandage protector of claim 1 including a series of lace loops spaced along each terminal side edge, and wherein said means for interconnecting the two separable terminal side edges comprises a lace adapted to be threaded through said lace loops and tied to securely hold said body encompassing bandage protector around the animal's body.

3. The body encompassing bandage protector of claim 1 wherein said means for interconnecting said two separable terminal side edges comprises a zipper assembly that is operatively associated with each of the two terminal side edges.

4. The body encompassing bandage protector of claim 1 wherein said main body encompassing means includes an intermediate rear extending portion having rear corners from which respective ends of said cross straps extend such that each strap crosses the other and joins the opposite side of said main body encompassing covering means.

5. The body encompassing bandage protector of claim 4 wherein the rear boundary extending outwardly from the intermediate rear extending portion is generally arcuate shaped such that when said main body encompassing covering means is fitted on said animal the generally arcuate shaped rear boundary area lies adjacent the inner side of the animal's respective upper thigh and extends therefrom up along the rear side of the animal's main body.

6. The body encompassing bandage protector of claim 4 wherein said bandage protector includes a detachable tail hole opening insert for preventing access to the female reproductive organs and thereby preventing the female animal from being impregnated during a period of being in heat, said detachable tail hole opening insert comprising an insert flap and means for detachably securing said insert flap within said tail hole.

7. The body encompassing bandage protective of claim 6 wherein said main body encompassing covering means is constructed of a stretchable polyester type material.

8. The body encompassing bandage protector of claim 4 wherein said front connecting means includes a series of spaced apart loops which extend from the front portion of the main body encompassing covering means and are adapted to encircle and attach to a collar extending around the animal's neck.

9. The body encompassing bandage protector of claim 8 wherein said main body encompassing covering means includes an intermediate front chest extension portion, and wherein said chest extension portion includes a pair of the front spaced apart loops for attaching to the animal's collar.

10. The body encompassing bandage protector of claim 9 wherein said means for interconnecting said two separable terminal side edges comprises a series of lace loops spaced along each terminal side edge, and a lace string adapted to be laced through said lace loops whereupon when properly tied the main body encompassing covering means is securely held about the animal's body.

11. The body encompassing bandage protector of claim 9 wherein said means for interconnecting said two separable terminal side edges includes a zipper assembly associated with each terminal side edge.

* * * * *